(12) United States Patent
Oshida et al.

(10) Patent No.: US 10,501,122 B2
(45) Date of Patent: Dec. 10, 2019

(54) DRIVING ASSISTANCE DEVICE

(71) Applicant: HONDA MOTOR CO., LTD., Tokyo (JP)

(72) Inventors: Kei Oshida, Wako (JP); Haruhiko Nishiguchi, Wako (JP); Satoshi Fujii, Wako (JP); Daisuke Kubota, Wako (JP); Ryohsaku Arakawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 272 days.

(21) Appl. No.: 15/612,138

(22) Filed: Jun. 2, 2017

(65) Prior Publication Data
US 2017/0349212 A1  Dec. 7, 2017

(30) Foreign Application Priority Data

Jun. 2, 2016  (JP) .................................. 2016-110820

(51) Int. Cl.
*B62D 15/00* (2006.01)
*B60W 10/20* (2006.01)
*B62D 15/02* (2006.01)
*G01L 5/22* (2006.01)

(52) U.S. Cl.
CPC .......... *B62D 15/0255* (2013.01); *G01L 5/221* (2013.01); *B60R 2300/804* (2013.01); *B60R 2300/8093* (2013.01)

(58) Field of Classification Search
CPC .......... B62D 15/0255; B60R 2300/804; B60R 2300/8093; B60W 30/18163

USPC .......................................................... 701/41
See application file for complete search history.

(56) References Cited

U.S. PATENT DOCUMENTS

| 5,765,116 A * | 6/1998 | Wilson-Jones ...... B62D 15/025 180/168 |
| 6,178,365 B1 * | 1/2001 | Kawagoe .............. B62D 1/286 180/167 |
| 2012/0296522 A1 * | 11/2012 | Otuka ..................... G08G 1/167 701/41 |
| 2016/0107687 A1 * | 4/2016 | Yamaoka ........... B62D 15/0255 701/41 |
| 2017/0225685 A1 * | 8/2017 | Aoki ..................... B60W 10/20 |

FOREIGN PATENT DOCUMENTS

| JP | 2009-35214 A | 2/2009 |
| JP | 2011-168194 A | 9/2011 |
| JP | 2012-226392 A | 11/2012 |

(Continued)

OTHER PUBLICATIONS

Office Action dated Nov. 28, 2018, issued in counterpart Chinese Application No. 201710380294.9. (6 pages).

(Continued)

*Primary Examiner* — Nadeem Odeh
(74) *Attorney, Agent, or Firm* — Westerman, Hattori, Daniels & Adrian, LLP

(57) ABSTRACT

An Road Departure Mitigation (RDM) controller executes RDM control (steering suppression control). However, the RDM controller does not execute RDM control in cases in which lane changing has been determined to be possible by a Lane Change (LC) determination section and a torque sensor has detected a steering input of a predetermined amount or greater.

14 Claims, 9 Drawing Sheets

(56) References Cited

FOREIGN PATENT DOCUMENTS

| | | |
|---|---|---|
| JP | 2012-232704 A | 11/2012 |
| JP | 2013-212838 A | 10/2013 |
| JP | 2014-44707 A | 3/2014 |
| JP | 2015-115040 A | 6/2015 |
| JP | 2015-205558 A | 11/2015 |
| WO | 2012/001786 A1 | 1/2012 |

OTHER PUBLICATIONS

Office Action dated Jan. 9, 2018, issued in counterpart Japanese Application No. 2016-110820, with English machine translation. (7 pages).

Office Action dated Jul. 10, 2018, issued in counterpart Japanese Application No. 2016-110820, with English machine translation. (6 pages).

* cited by examiner

DRIVING ASSISTANCE DEVICE

CROSS REFERENCES TO RELATED APPLICATIONS

The present application claims priority under 35 U.S.C. § 119 to Japanese Patent Application No. 2016-110820, filed Jun. 2, 2016, entitled "Driving Assistance Device." The contents of this application are incorporated herein by reference in their entirety.

TECHNICAL FIELD

The present disclosure relates to a driving assistance device that automatically performs a vehicle lane change in accordance with a lane change indication operation performed by a driver.

BACKGROUND

Current vehicles are equipped with functionality to assist steering operations performed by a driver. Examples of such steering assistance functionality include Lane Keep Assist Systems (LKAS) that cause a vehicle to travel in the substantial center of a lane, Lane Departure Warning (LDW) and Road Departure Mitigation (RDM) that warn of and suppress vehicle lane departure, and the like. LKAS executes lane keep assist control and LDW and RDM execute steering suppression control. Additionally, in recent years, Automatic Lane Change (ALC) systems that execute automatic lane change control are also being developed as steering assistance functionality.

Japanese Unexamined Patent Application Publication No. 2013-212838 (paragraphs [0100] to [0104]; claims 5, 7, and 9; and FIG. 8) describes a steering assistance device that generates supplementary torque for executing lane keep control. When a driver performs steering operation while lane keep control is being executed, this steering assistance device suppresses the supplementary torque and cancels lane keep control.

Japanese Unexamined Patent Application Publication No. 2012-226392 (paragraphs [0016] and [0018]) describes a driving assistance system that executes automatic lane change control when operation of a direction indicating device is detected while lane keep control is being executed. This driving assistance system executes automatic lane change control by changing a lane to be kept to a lane in an operation direction of a direction indicating device switch.

SUMMARY

According to inventors' study, it is desirable to have an automatic lane change control that can not only be started in accordance with an operation of a direction indicating device such as in the driving assistance system of Japanese Unexamined Patent Application Publication No. 2012-226392, but can also be started in accordance with steering operation using a steering wheel. However when automatic lane change control is started in accordance with steering operation, issues such as the following are anticipated.

For example, when a driver performs steering operation using a steering wheel, the vehicle will approach the lane markings in the direction of steering. When this occurs, if steering suppression control such as LDW control or RDM control is being executed by the vehicle, steering suppression functionality will act as the vehicle approaches the lane markings and cause a lane departure warning (vibration of the steering wheel, a warning display, a warning sound) to be produced. When a lane departure warning is produced regardless of an intent to change lanes, the driver experiences discomfort. Japanese Unexamined Patent Application Publication Nos. 2013-212838 and 2012-226392 do not describe performing lane change control in accordance with steering operation or performing a lane change while steering suppression control is being performed.

The present application describes, for example, a driving assistance device that does not impart a sense of discomfort to a driver when an automatic lane change is performed in accordance with steering operation using a steering wheel while steering suppression control is being performed.

A driving assistance device according to the present disclosure includes a recognition section, a lane change determination section, an automatic lane change controller, a torque sensor, and a steering suppression controller. The recognition section is configured to recognize lane markings and objects nearby a vehicle. The lane change determination section is configured to determine whether or not lane changing is possible based on a recognition result of the recognition section. The automatic lane change controller is configured to, when lane changing has been determined to be possible by the lane change determination section and operation of a direction indicator has been detected, execute automatic lane change control of the vehicle in a direction indicated by the operation. The torque sensor is configured to detect a steering torque and a steering direction. The steering suppression controller is configured to execute steering suppression control. The steering suppression controller does not execute steering suppression control when lane changing has been determined to be possible by the lane change determination section and the torque sensor has detected a predetermined steering input or greater.

According to the present disclosure, for example, when lane changing is possible and steering input is a predetermined value or greater, steering suppression control is not executed. Accordingly, in cases in which lane changing is possible, if the driver performs steering operation using the steering wheel with the intent of executing ALC control, an unnecessary warning produced by the steering suppression control can be suppressed. The driver therefore does not experience discomfort during automatic lane change.

The automatic lane change controller may place the automatic lane change control in an enabled state when lane changing has been determined to be possible by the lane change determination section and the steering input has been detected to be greater than or equal to a first torque based on a detection result of the torque sensor. This configuration enables the placement of automatic lane change control into the enabled state, namely, into a state from which automatic lane change control can be started at any time, to be triggered by a steering torque from steering operation performed by the driver becoming greater than or equal to the first torque.

After detection of the steering input, the automatic lane change controller may start the automatic lane change control of the vehicle along the steering direction when the steering torque has been detected to be less than or equal to a second torque not greater than the first torque. This configuration enables the start of automatic lane change control to be triggered by a steering torque from steering operation performed by the driver first becoming greater than or equal to the first torque, and then subsequently becoming less than or equal to the second torque. In other words, the driver continues the steering operation, and in cases in which a state where the steering torque is greater than the second torque is continually maintained, the automatic lane change control is placed into a standby state, enabling steering operation by the driver to be given priority.

The automatic lane change controller may place the automatic lane change control of the vehicle along the steering direction in a non-enabled state when the steering input has been detected to be greater than or equal to a third torque that is greater than the first torque based on a detection result of the torque sensor. This configuration enables steering operation by the driver to be given priority.

After placing the automatic lane change control in a state in which it cannot be started, the automatic lane change controller may place the automatic lane change control in an enabled state when the vehicle has been detected to be straddling a lane or the vehicle has been detected to have moved sideways by a predetermined distance or greater based on a recognition result of the recognition section. This configuration enables steering operation by the driver to be given priority at the start of lane changing, and enables the placement of automatic lane change control into the enabled state, namely, into a state from which automatic lane change control can be started at any time, to be triggered by sideways movement of the vehicle of a predetermined distance or greater.

After the vehicle has been detected to be straddling the lane or the vehicle has been detected to have moved sideways by the predetermined distance or greater, the automatic lane change controller may start the automatic lane change control when the steering torque has been detected to be less than or equal to a fourth torque not greater than the third torque. This configuration enables steering operation by the driver to be given priority at the start of lane changing, and enables the start of automatic lane change control to be triggered by sideways movement of the vehicle of a predetermined distance or greater and the steering torque becoming less than or equal to the fourth torque.

BRIEF DESCRIPTION OF THE DRAWINGS

The advantages of the disclosure will become apparent in the following description taken in conjunction with the following drawings.

DETAILED DESCRIPTION

Detailed explanation follows regarding preferred embodiments of a driving assistance device according to the present disclosure, with reference to the accompanying drawings.

1 Configuration

Figure 1:
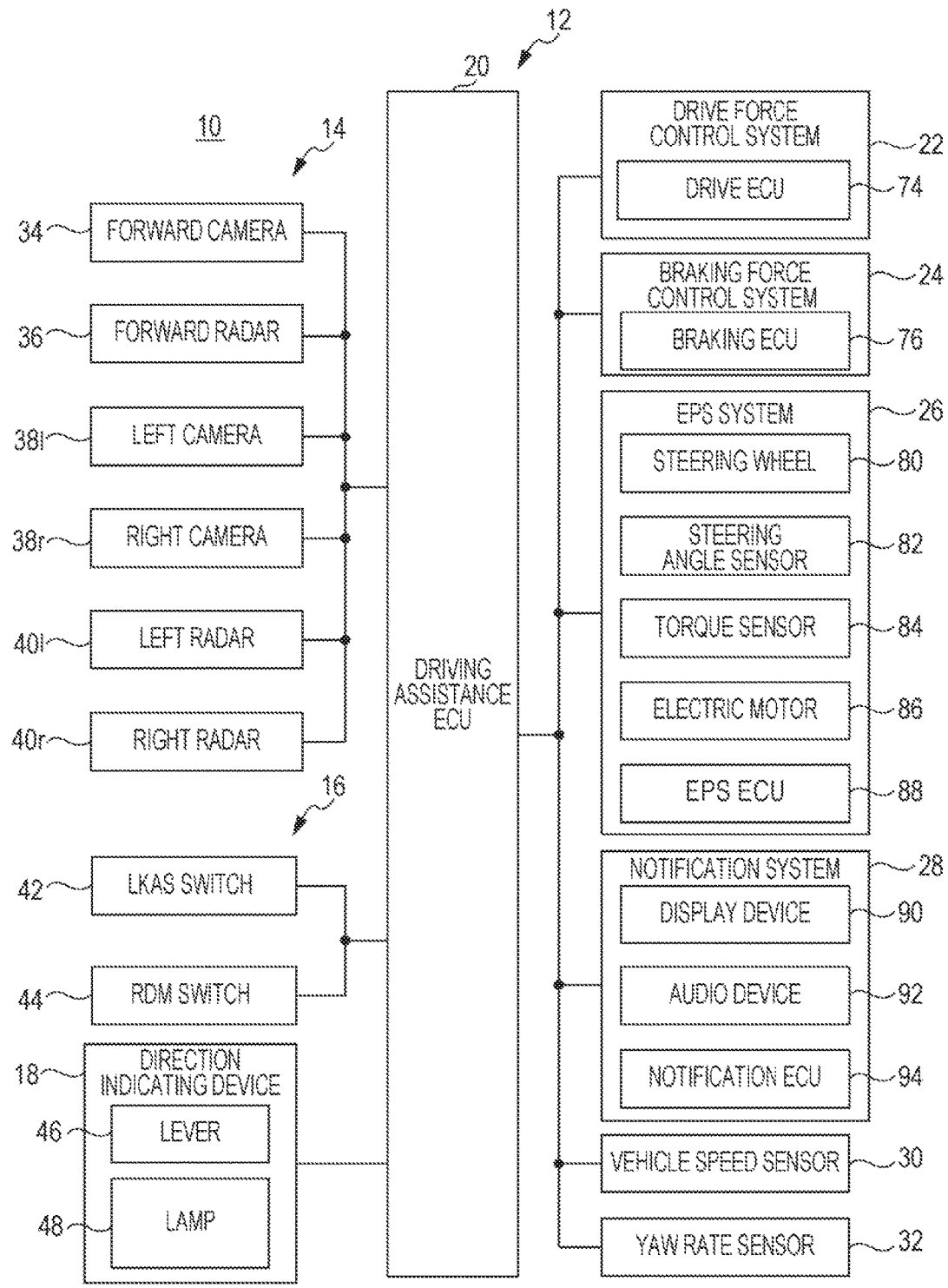
FIG. 1 is a block diagram illustrating configuration of a vehicle equipped with a driving assistance device according to a first embodiment.

As illustrated in FIG. 1, a vehicle 10 includes a driving assistance device 12. The driving assistance device 12 includes a surrounding information acquisition section 14, a switching section 16, a direction indicating device 18, a driving assistance device ECU 20, a drive force control system 22, a braking force control system 24, an electric power steering system 26 (referred to as "EPS system 26" hereafter), a notification system 28, a vehicle speed sensor 30, and a yaw rate sensor 32.

1-1 Surrounding Information Acquisition Section 14

The surrounding information acquisition section 14 is configured by various devices for detecting lane markings 102a to 102c (FIG. 3A, FIG. 3B, FIG. 4A, and FIG. 4B) and objects nearby the vehicle 10 (including, for example, nearby vehicles and pedestrians). The surrounding information acquisition section 14 includes a forward camera 34, a forward radar 36, a left camera 38l, a right camera 38r, a left radar 40l, and a right radar 40r.

The forward camera 34 (also referred to as "camera 34" hereafter) acquires images of in front of the vehicle 10 (referred to as "forward camera information" hereafter). The forward camera 34 outputs a signal corresponding to the forward camera information to the driving assistance device ECU 20.

Although one forward camera 34 is employed in the present embodiment, two forward cameras 34 may be disposed with left-right symmetry so as to configure a stereo camera. The forward camera 34 acquires forward images at predetermined timings. Although the forward camera 34 is a monochromatic camera utilizing light that primarily includes wavelengths in the visible region, the forward camera 34 may also be a color camera or an infrared camera. The forward camera 34 is, for example, disposed at a vehicle width direction central portion of a front section within the cabin of the vehicle 10 (for example, in the vicinity of a rear-view mirror). Alternatively, the forward camera 34 may be disposed at a vehicle width direction central portion of a front bumper section of the vehicle 10.

The forward radar 36 (also referred to as "radar 36" hereafter) transmits transmission waves, which are electromagnetic waves (in this case, millimeter waves), in front of the vehicle 10, and receives reflected waves, which are transmission waves that have been reflected back off of objects in front of the vehicle 10 (including, for example, nearby vehicles and pedestrians). Information relating to objects to the front that is included in the reflected waves is referred to as forward radar information. The forward radar 36 outputs a signal corresponding to the reflected waves to the driving assistance device ECU 20.

The forward radar 36 is disposed on a front side of the vehicle 10 (for example, on a front bumper and/or a front grille). Instead of the forward radar 36 that outputs millimeter waves, a laser radar or a sensor such as an ultrasonic sensor may also be employed.

The left camera 38l and the right camera 38r (also referred to as "cameras 38l and 38r" hereafter) acquire images of areas to the left and right sides of the vehicle 10 and of areas to the rear thereof, (referred to as "left and right camera information", or individually as "left camera information" and "right camera information" hereafter). Namely, the left camera 38l images an area to the rear-left of the vehicle 10 that includes the area to the left side of the vehicle 10, and the right camera 38r images an area to the rear-right of the vehicle 10 that includes the area to the right side of the vehicle 10. The cameras 38l and 38r output signals corresponding to the left and right camera information to the driving assistance device ECU 20.

Cameras with the same specification as the forward camera 34 or cameras with a different specification from the forward camera 34 may be respectively employed as the left camera 38l and the right camera 38r. The left camera 38l and the right camera 38r are, for example, disposed on the sides of the vehicle 10 (for example, in the vicinity of the side-view mirrors).

The left radar 40l and the right radar 40r (also referred to as "radar 40l" and "radar 40r" hereafter) transmit transmission waves, which are electromagnetic waves (in this case, millimeter waves), to the left and right sides and to the rear of the vehicle 10, and receive reflected waves, which are transmission waves that have been reflected back off of objects to either side or to the rear of the vehicle 10 (including, for example, nearby vehicles and pedestrians). Information relating to objects to either side or to the rear that is included in the reflected waves is referred to as left and right radar information. The radars 40l and 40r output signals corresponding to the reflected waves to the driving assistance device ECU 20.

The left radar 40l is disposed in the vicinity of a left end on a rear side of the vehicle 10 (for example, on a rear bumper and/or a rear grille). The left radar 40l may also be disposed on a left side door mirror or front door (for example, in the vicinity of the door mirror). The right radar 40r is disposed in the vicinity of a right end on the rear side of the vehicle 10 (for example, on the rear bumper and/or the rear grille). The right radar 40r may also be disposed on a right side door mirror or front door (for example, in the vicinity of the door mirror). Instead of the left radar 40l and the right radar 40r that output millimeter waves, laser radars or sensors such as ultrasonic sensors may also be employed.

1-2 Switching Section 16

The switching section 16 is configured by switches for the driver to command the driving assistance device ECU 20 to perform control of various types of assistance. In the present embodiment, the switching section 16 includes a LKAS switch 42 and a RDM switch 44.

The LKAS switch 42 include a switch (not illustrated) for the driver to instruct the driving assistance device ECU 20 to start/stop lane keep assist control (LKAS control) and a circuit (not illustrated) that outputs a signal (referred to as a "start/stop signal" hereafter) instructing the driving assistance device ECU 20 to start/stop LKAS control in accordance with the switch operation. The RDM switch 44 includes a switch (not illustrated) for the driver to instruct the driving assistance device ECU 20 to start/stop road departure mitigation control (RDM control) and a circuit (not illustrated) that outputs a signal (referred to as a "start/stop signal" hereafter) instructing the driving assistance device ECU 20 to start/stop RDM control in accordance with the switch operation. In addition to, or instead of, the switches 42 and 44, the start/stop control of the various types of assistance may also be instructed using other methods (such as audio input through a non-illustrated microphone). Configuration may also be made such that the LKAS switch 42 and the RDM switch 44 are configured by a shared switch.

1-3 Direction Indicating Device 18

The direction indicating device 18 includes left side (left turn direction) and right side (right turn direction) directional indicator lamps 48 (referred to as "lamps 48" hereafter), a lever 46 for switching the directional indicator lamps 48 on and off, and a drive circuit (not illustrated) for the directional indicator lamps 48. In accordance with the operation direction of the lever 46, the direction indicating device 18 outputs a lever operation signal corresponding to the operation of the lever 46 to the driving assistance device ECU 20. The direction indicating device 18 is input with a start flashing/stop flashing signal instructing the start of flashing/stop of flashing of the directional indicator lamps 48 from the driving assistance device ECU 20.

1-4 Driving Assistance Device ECU 20

Figure 2:
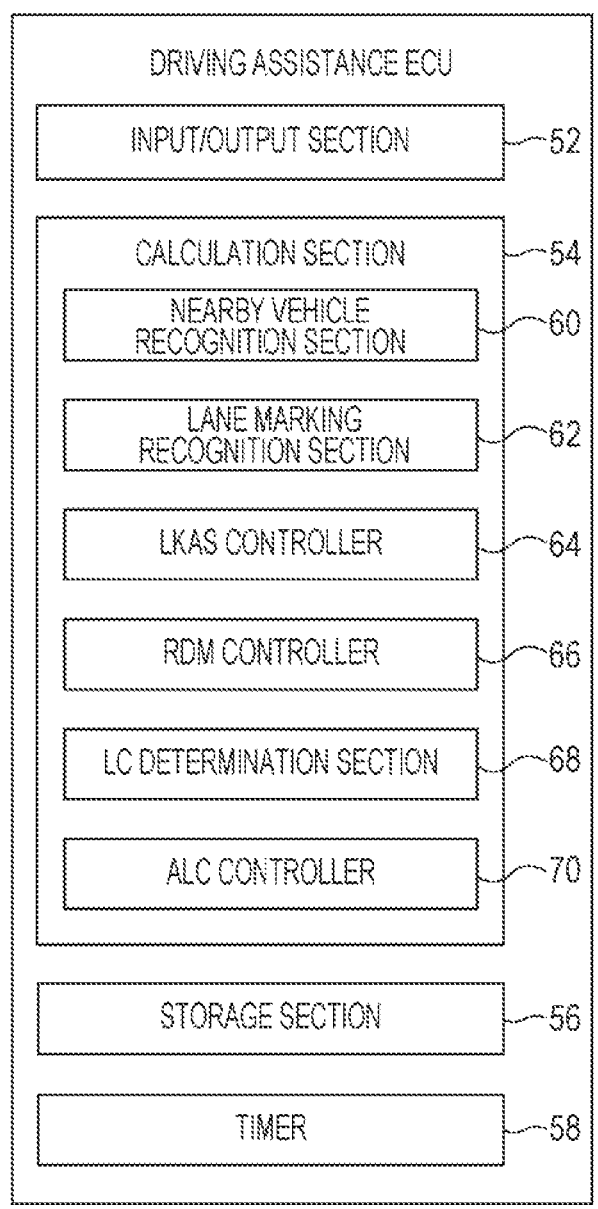
FIG. 2 is a block diagram of a driving assistance device ECU.

The driving assistance device ECU 20 controls the driving assistance actions of the driving assistance device 12. The driving assistance device ECU 20 is explained with reference to FIG. 2. As illustrated in FIG. 2, the driving assistance device ECU 20 includes an input/output section 52, a calculation section 54, a storage section 56, and a timer 58.

The input/output section 52 supplies respective signals output from the surrounding information acquisition section 14 and the switching section 16 and respective detection signals output from the sensors 82, 84, 30, and 32, described later, to the calculation section 54. The input/output section 52 also outputs various command signals generated by the calculation section 54 to the direction indicating device 18, and to a drive ECU 74, a braking ECU 76, an EPS ECU 88, and a notification ECU 94, described later. The input/output section 52 includes a non-illustrated A/D converter circuit that converts externally input analog signals to digital signals.

The calculation section 54 performs calculations based on the respective signals output from the surrounding information acquisition section 14 and the switching section 16, and based on the respective detection signals output from the sensors 82, 84, 30, and 32, described later. The calculation section 54 generates respective signals for the drive ECU 74, the braking ECU 76, the EPS ECU 88, the notification ECU 94, and the direction indicating device 18 based on calculation results.

The calculation section 54 includes a nearby vehicle recognition section 60, a lane marking recognition section 62, a LKAS controller 64, a RDM controller 66, a LC determination section 68, and an ALC controller 70. Each of these sections is implemented by executing a program stored in the storage section 56. The program may be externally supplied through a non-illustrated wireless communication device (such as a mobile telephone or a smartphone). A portion of the program may also be configured by hardware (circuit components).

The nearby vehicle recognition section (recognition section) 60 recognizes nearby vehicles based on respective camera information output from the cameras 34, 38l, and 38r (front camera information, left and right camera information) and respective radar information output from the radars 36, 40l, and 40r (forward radar information, left and right radar information), and outputs information relating to nearby vehicles (also referred to as "nearby vehicle information" hereafter).

The lane marking recognition section (recognition section) 62 recognizes lane markings 102a to 102c (see FIG. 3A, etc.) based on the respective camera information output from the cameras 34, 38l, and 38r, and outputs information relating to the lane markings 102a to 102c (also referred to as "lane marking information" hereafter).

The LKAS controller 64 performs LKAS control of the vehicle 10 based on the lane marking information output from the lane marking recognition section 62. Specifically, the LKAS controller 64 computes a target torque Trtr necessary for an electric motor 86 to make the vehicle 10 travel in the substantial center of a lane 104l or 104r. The LKAS controller 64 starts LKAS control in accordance with a start signal output from the LKAS switch 42 and stops LKAS control in accordance with a stop signal output from the LKAS switch 42.

The RDM controller (steering suppression controller) 66 performs RDM control of the vehicle 10 based on the lane marking information output from the lane marking recognition section 62. Specifically, the RDM controller 66 computes a target torque Trtr necessary for the electric motor 86 to vibrate a steering wheel 80 when the vehicle 10 approaches the lane markings 102a to 102c. In cases in which the driver does not perform an operation to avoid departure after vibration of the steering wheel 80, the RDM controller 66 also computes a target torque Trtr required for the electric motor 86 to make the vehicle 10 go back along a direction toward the center of the lane 104l or 104r. Additionally, in cases in which it is difficult to avoid departure by only steering intervention, the RDM controller 66 computes a deceleration necessary to decelerate the vehicle 10 to a speed at which departure avoidance is possible. The RDM controller 66 starts RDM control in accordance with a start signal output from the RDM switch 44 and stops RDM control in accordance with a stop signal output from the RDM switch 44.

The LC determination section (lane change determination section) 68 determines whether or not it is possible to safely change lanes based on the nearby vehicle information output from the nearby vehicle recognition section 60, the lane marking information output from the lane marking recognition section 62, and a vehicle speed V detected by the vehicle speed sensor 30. Specifically, the LC determination section 68 determines whether a lane change is possible based on the distance and relative speed between the vehicle 10 and a nearby vehicle present in a lane 104l or 104r that is adjacent to the lane 104l or 104r in which the vehicle 10 is traveling.

The ALC controller (lane change controller) 70 performs automatic lane change control (ALC control) of the vehicle 10 based on the nearby vehicle information output from the nearby vehicle recognition section 60 and the lane marking information output from the lane marking recognition section 62. Specifically, the ALC controller 70 executes the processing illustrated in FIG. 6 to FIG. 8.

The storage section 56 is configured by RAM that stores digitally converted image signals, temporary data to be provided for various calculation processing, etc.; ROM that stores executable programs, tables, maps, etc.; and the like. The timer 58 keeps track of various timings. In the present embodiment, the timer 58 keeps track of an ALC control execution time t. Note that the timer 58 may also be configured by software.

1-5 Drive Force Control System 22

Returning to FIG. 1, explanation continues regarding configuration provided to the driving assistance device 12. The drive force control system 22 includes the drive ECU 74. The drive ECU 74 executes drive force control of the vehicle 10. During drive force control, the drive ECU 74 controls the drive force of the vehicle 10 through control of a non-illustrated drive source (an engine and/or a drive motor). The drive force control of the present embodiment includes automatic cruise control (ACC, CC). Automatic cruise control is control that makes the vehicle 10 travel such that the vehicle speed V matches a target vehicle speed.

1-6 Braking Force Control System 24

The braking ECU 76 of the braking force control system 24 executes braking force control of the vehicle 10. During braking force control, the braking ECU 76 controls the braking force of the vehicle 10 through control of a non-illustrated braking mechanism or the like.

1-7 EPS System 26

The EPS system 26 includes the steering wheel 80, a steering angle sensor 82, a torque sensor 84, the electric motor 86, and the EPS ECU 88. The steering angle sensor 82 detects a steering angle $\theta$ of the steering wheel 80, and outputs a signal corresponding to the steering angle $\theta$ to the driving assistance device ECU 20 or the like. The torque sensor 84 detects a steering torque Tr (steering input) applied about a rotation axis of the steering wheel 80, and outputs a signal corresponding to the steering torque Tr to the driving assistance device ECU 20 or the like. The electric motor 86 is connected somewhere between the steering wheel 80 and the non-illustrated wheels, and imparts a steering assist force. The EPS ECU 88 executes steering assist control. During steering assist control, the EPS ECU 88 assists driver steering through the control of configuration elements (the steering angle sensor 82, the torque sensor 84, the electric motor 86, and the like) of an electric power steering device.

1-8 Vehicle Speed Sensor 30, Yaw Rate Sensor 32

The vehicle speed sensor 30 detects a vehicle speed V of the vehicle 10 and outputs a signal corresponding to the vehicle speed V to the driving assistance device ECU 20 or the like. The yaw rate sensor 32 detects a yaw rate Yr of the vehicle 10 and outputs a signal corresponding to the yaw rate Yr to the driving assistance device ECU 20 or the like.

2 ALC Control Patterns

Explanation follows regarding the ALC control executed in the present embodiment, with reference to FIG. 3A, FIG. 3B, FIG. 4A, and FIG. 4B. FIG. 3A, FIG. 3B, FIG. 4A, and FIG. 4B each illustrate a state of automatic lane change of the vehicle 10 from a right lane 104r to a left lane 104l.

2-1 Pattern 1

Figure 3A:
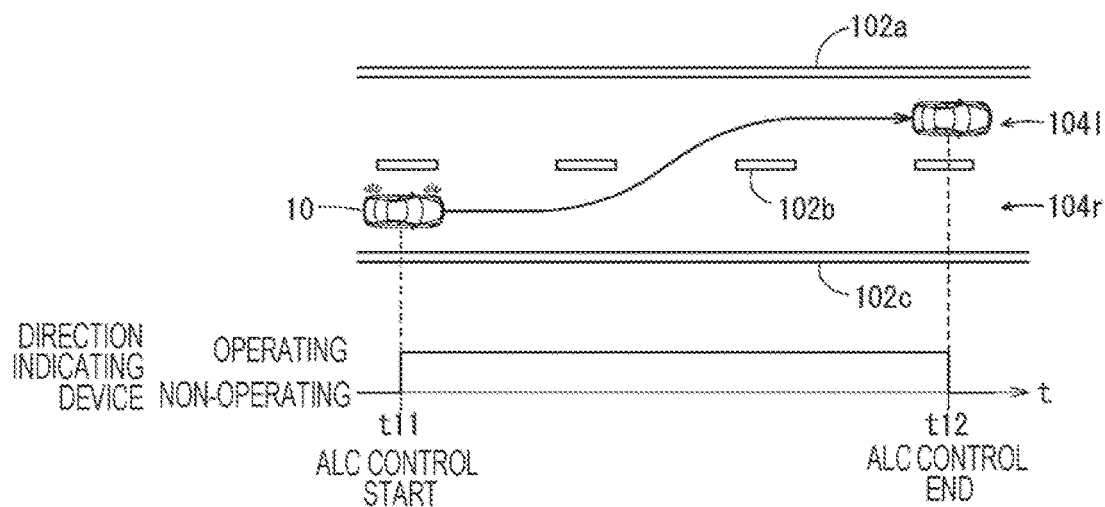
FIG. 3A is an explanatory diagram illustrating vehicle behavior and an operating/non-operating state of a direction indicating device during ALC control.

Explanation follows regarding Pattern 1, with reference to FIG. 3A. Pattern 1 is basic ALC control, and is ALC control started by driver operation of the lever 46 of the direction indicating device 18.

In a lane change, the driver operates the lever 46 of the direction indicating device 18. At time t11, when the left side lamp 48 is switched from a non-operating state to an operating state and a lever operation signal is output from the direction indicating device 18 to the driving assistance device ECU 20, the ALC controller 70 starts ALC control. At time t12, when the vehicle 10 reaches a target position in the left lane 104l, the ALC controller 70 stops ALC control. When this occurs, the ALC controller 70 outputs a stop flashing signal to the direction indicating device 18. The left side lamp 48 then switches from the operating state to the non-operating state.

2-2 Pattern 2

Figure 3B:
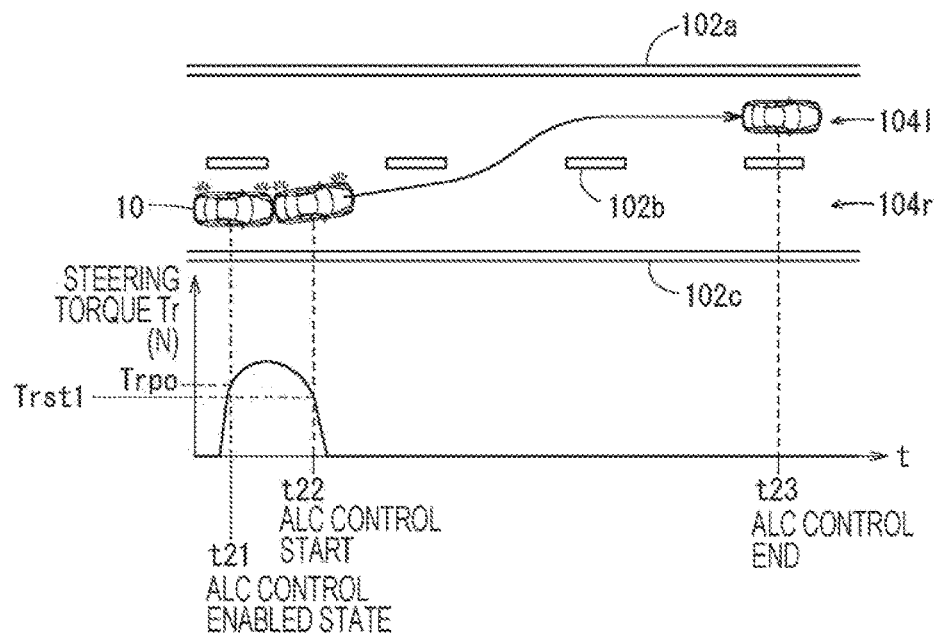
FIG. 3B is an explanatory diagram illustrating vehicle behavior and a steering torque state during ALC control.

Explanation follows regarding Pattern 2, with reference to FIG. 3B. Pattern 2 is ALC control particular to the present disclosure, and is ALC control that is started by driver operation of the steering wheel 80. Pattern 2 is a pattern in which steering operation is mainly performed by the driving assistance device ECU 20 over substantially the entire interval between starting and ending the lane change.

In a lane change to the left, the driver operates the steering wheel 80 to the left. At time t21, when the steering torque Tr becomes greater than or equal to an ALC possible torque Trpo (first torque), the ALC controller 70 places ALC control in an enabled state. When the driver lessens the operation of the steering wheel 80, the steering torque Tr is reduced. At time t22, when the steering torque Tr becomes less than or equal to an ALC start torque Trst1 (second torque), the reduction in steering torque Tr triggers the ALC controller 70 to start ALC control. At time t23, when the vehicle 10 reaches a target position in the left lane 104l, the ALC controller 70 ends ALC control.

2-3 Pattern 3

Figure 4A:
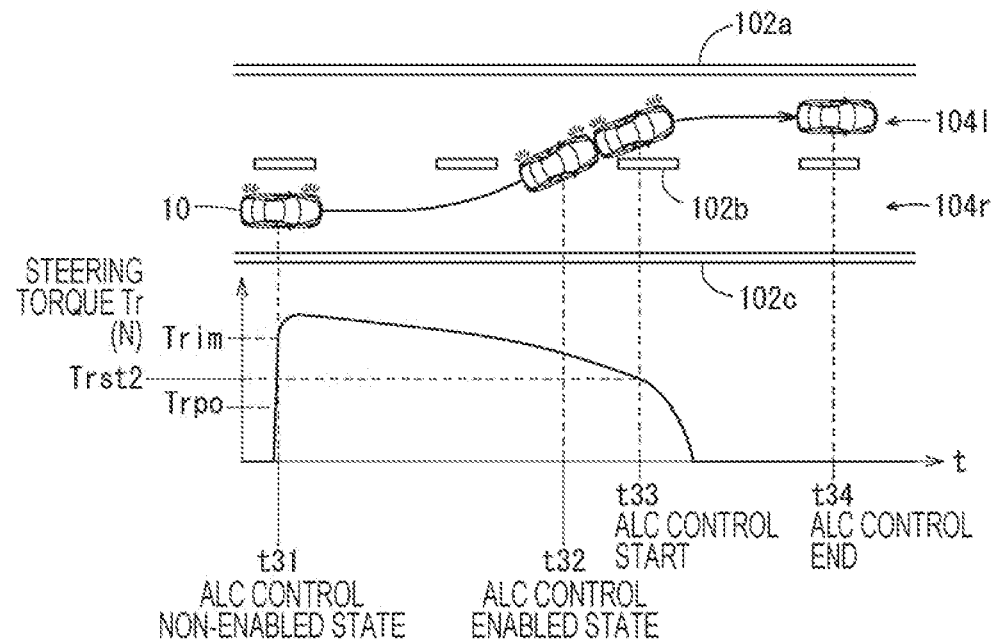
FIG. 4A and FIG. 4B are explanatory diagrams illustrating vehicle behavior and a steering torque state during ALC control.

Explanation follows regarding Pattern 3, with reference to FIG. 4A. Pattern 3 is also ALC control particular to the present disclosure, and is ALC control that is started by driver operation of the steering wheel 80. Pattern 3 is a pattern in which steering operation is mainly performed by the driver over the first half of a lane change, and steering operation is mainly performed by the driving assistance device ECU 20 over the second half of the lane change.

In a lane change to the left, the driver operates the steering wheel 80 to the left. At time t31, when the steering torque Tr becomes greater than or equal to an ALC not-possible torque Trim (third torque) that is greater than the ALC possible torque Trpo (first torque), the ALC controller 70 places the ALC control in a non-enabled state. In this state, the lane change is performed due to steering operation by the driver. At time t32, when a sideways movement amount of the vehicle 10 becomes greater than or equal to a predetermined amount (for example, when the vehicle 10 is straddling the left lane 104l and the right lane 104r), the ALC controller 70 places the ALC control in the enabled state. Additionally, at time t33, when the steering torque Tr becomes less than or equal to an ALC start torque Trst2 (fourth torque), the reduction in steering torque Tr triggers the ALC controller 70 to start ALC control. At time t34, when the vehicle 10 reaches a target position in the left lane 104l, the ALC controller 70 ends the ALC control.

2-4 Pattern 4

Figure 4B:
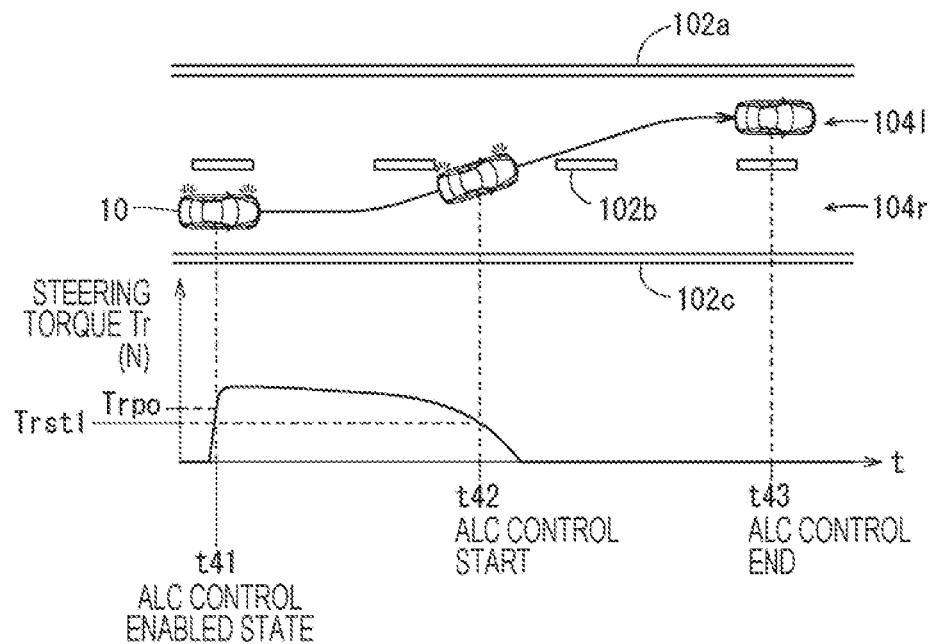

Explanation follows regarding Pattern 4, with reference to FIG. 4B. Pattern 4 is also ALC control particular to the present disclosure, and is ALC control that is started by driver operation of the steering wheel 80. Pattern 4 corresponds to a pattern that is in between the Pattern 2 and Pattern 3 described above, in which the driver performs steering operation for a short while after the ALC controller 70 places the ALC control in the enabled state.

In a lane change to the left, the driver operates the steering wheel 80 to the left. At time t41, when the steering torque Tr becomes greater than or equal to the ALC possible torque Trpo (first torque), the ALC controller 70 places the ALC control in the enabled state. Then, after performing further steering operation, when the driver lessens the operation of the steering wheel 80, the steering torque Tr is reduced. At time t42, when the steering torque Tr becomes less than or equal to the ALC start torque Trst1 (second torque), the reduction in steering torque Tr triggers the ALC controller 70 to start ALC control. At time t43, when the vehicle 10 reaches a target position in the left lane 104l, the ALC controller 70 ends the ALC control.

3 Processing Content 3-1 ALC Processing

Figure 5:
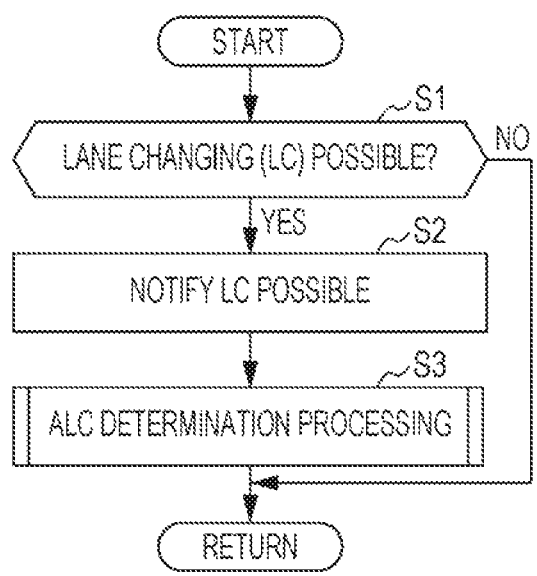
FIG. 5 is a flowchart of ALC processing.

Explanation follows regarding the ALC processing performed in the present embodiment, with reference to FIG. 5. In the ALC processing explained below, the driving assistance device ECU 20 periodically acquires the respective camera information output from the cameras 34, 38l, and 38r; the respective radar information output from the radars 36, 40l, and 40r; the steering angle θ information output from the steering angle sensor 82; the steering torque Tr information output from the torque sensor 84; the vehicle speed V information output from the vehicle speed sensor 30; and the yaw rate Yr information output from the yaw rate sensor 32. The ALC processing explained below also assumes that the LKAS controller 64 is executing LKAS control and that the RDM controller 66 is executing RDM control at the start of processing (START in FIG. 5).

At step S1, the LC determination section 68 determines whether or not lane changing is possible. In cases in which a nearby vehicle is present in the left lane 104l adjacent to the lane 104r in which the vehicle 10 is traveling (FIG. 3A, FIG. 3B, FIG. 4A, and FIG. 4B), the LC determination section 68 computes the relative speed and the distance between the nearby vehicle and the vehicle 10. Then, the LC determination section 68 determines whether or not the vehicle 10 can safely perform a lane change. In cases in which a nearby vehicle is not detected in the adjacent left lane 104l, or in cases in which it is determined that a lane change can be performed safely, the LC determination section 68 determines that lane changing is possible. However, in cases in which it is determined that a lane change cannot be performed safely, the LC determination section 68 determines that lane changing is not possible. In cases in which lane changing is possible (step S1: YES), processing transitions to step S2. In cases in which lane changing is not possible (step S1: NO), and the determination of whether lane changing is possible (step S1) is performed again without performing subsequent processing.

At step S2, the LC determination section 68 outputs a notification signal to the notification system 28 through the input/output section 52. The notification ECU 94 controls a display device 90 and/or an audio device 92 in accordance with the notification signal. The display device 90 gives notification that lane changing is possible through a graphical display. The audio device 92 gives notification that lane changing is possible through audio output.

At step S3, the ALC determination processing (FIG. 6, FIG. 7) is executed. In the ALC determination processing, determination is made as to whether or not ALC control is executed, and in cases in which ALC control is executed, as to which ALC control to execute from out of Pattern 1 to Pattern 4 described above. When ALC determination processing ends, the determination of whether lane changing is possible (step S1) is performed again.

3-2 ALC Determination Processing

Figure 6:
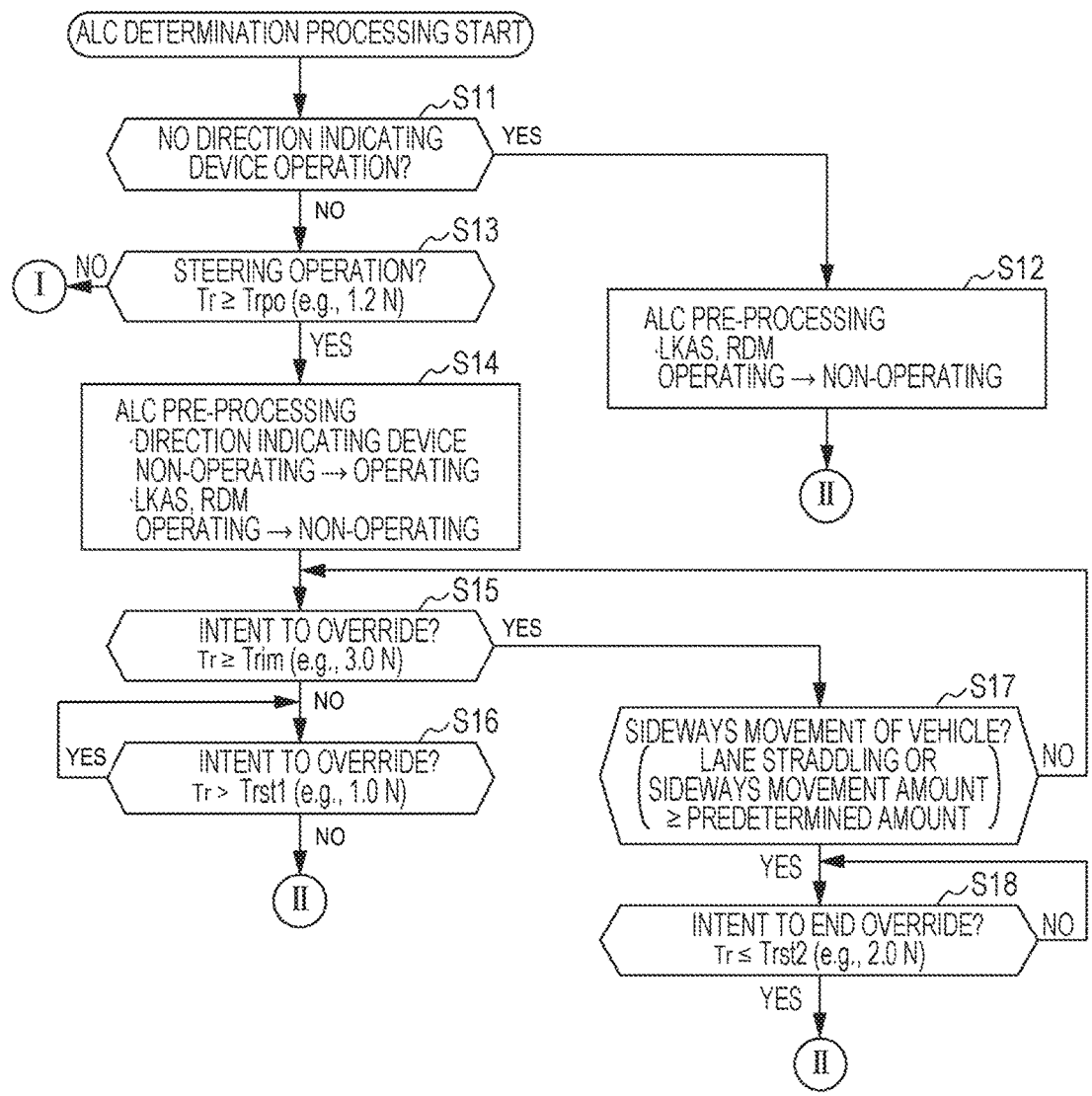
FIG. 6 is a flowchart of ALC determination processing.
Figure 7:
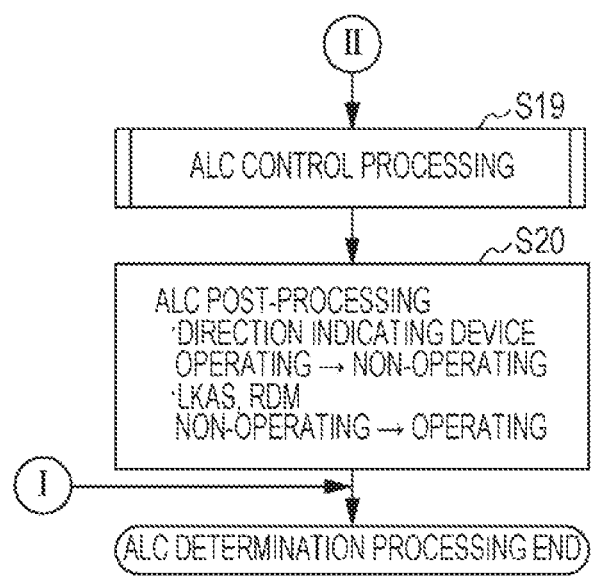
FIG. 7 is a flowchart of ALC determination processing.

Explanation follows regarding the ALC determination processing executed at step S3 of the ALC processing illustrated in FIG. 5, with reference to FIG. 6 and FIG. 7. In the ALC determination processing, the steering torque Tr detected by the torque sensor 84 is compared with four predetermined torques stored in the storage section 56 to determine which processing should be executed. The four predetermined torques are the ALC possible torque Trpo (first torque), the ALC start torque Trst1 (second torque), the ALC not-possible torque Trim (third torque), and the ALC start torque Trst2 (fourth torque) employed in the explanations of Pattern 1 to Pattern 4. In the following explanation, these are also referred to as predetermined torques Trpo, Trst1, Trim, and Trst2.

In the present embodiment, the relationship between the magnitudes of the four predetermined torques Trpo, Trst1, Trim, and Trst2 is set as follows:

ALC possible torque Trpo (first torque) ALC start torque Trst1 (second torque)

ALC possible torque Trpo (first torque)<ALC not-possible torque Trim (third torque)

ALC not-possible torque Trim (third torque) ALC start torque Trst2 (fourth torque)

In the following explanation, although specific values (1.2 N, 1.0 N, 3.0 N, and 2.0 N) are employed in order to simplify understanding of the relationship between the magnitudes of the four torques, the present disclosure is not limited to these values.

At step S11, the ALC controller 70 determines whether or not the direction indicating device 18 is being operated. Namely, the ALC controller 70 determines whether or not the direction indicating device 18 is being operated by the driver to instruct the execution of ALC control. When the lever 46 of the direction indicating device 18 is operated, a lever operation signal is output from the direction indicating device 18 to the driving assistance device ECU 20. The ALC controller 70 detects that an operation has been performed on the direction indicating device 18 by the lever operation signal being input to the driving assistance device ECU 20. In cases in which the direction indicating device 18 is being operated (step S11: YES), processing transitions to step S12. However, in cases in which the direction indicating device 18 is not being operated (step S11: NO), processing transitions to step S13.

When processing transitions from step S11 to step S12, the ALC controller 70 executes ALC control pre-processing. As the pre-processing, a signal for requesting temporary stoppage is output to the LKAS controller 64 and the RDM controller 66. In accordance with the stoppage request, the LKAS controller 64 and the RDM controller 66 switch the LKAS control and the RDM control from an operating state to a non-operating state. When step S12 ends, processing transitions to step S19 illustrated in FIG. 7.

When processing transitions from step S11 to step S13, the ALC controller 70 determines whether or not there has been steering operation by the driver. Namely, the ALC controller 70 determines whether or not the execution of ALC control is being instructed by steering operation. Here, the ALC controller 70 compares the steering torque Tr with the predetermined torque Trpo (e.g., 1.2 N) to determine whether or not there has been steering operation. In cases in which the steering torque Tr is greater than or equal to the predetermined torque Trpo (step S13: YES), it is determined that there is steering operation. In such cases, processing transitions to step S14. However, in cases in which the steering torque Tr is less than the predetermined torque Trpo (step S13: NO), it is determined that there is no steering operation. In such cases, the ALC determination processing ends.

Note that in the processing of step S13, in cases in which steering torque Tr predetermined torque Trpo, namely in cases in which it is determined that there is steering operation, the ALC controller 70 places the ALC control in the enabled state from which ALC control can be executed at any time. When this is performed, a flag may be set.

When processing transitions from step S13 to step S14, the ALC controller 70 executes ALC control pre-processing. Here, the ALC controller 70 outputs a start flashing signal to the direction indicating device 18 through the input/output section 52. In accordance with the start flashing signal, the direction indicating device 18 switches the respective lamp 48 from a non-operating state to an operating state. The ALC controller 70 also outputs a stop signal for requesting temporary stoppage to the LKAS controller 64 and the RDM controller 66. In accordance with the stop signal, the LKAS controller 64 and the RDM controller 66 switch LKAS control and RDM control from an operating state to a non-operating state.

As step S15, the ALC controller 70 determines whether or not the driver intends to perform an override (intervention operation). Here, the ALC controller 70 compares the steering torque Tr with the predetermined torque Trim (e.g., 3.0 N) to determine whether or not there is intent to override. In cases in which the steering torque Tr is less than the predetermined torque Trim (step S15: NO), it is determined that there is no intent to override. In such cases, processing transitions to step S16. However, in cases in which the steering torque Tr is greater than or equal to the predetermined torque Trim (step S15: YES), it is determined that there is intent to override. In such cases, processing transitions to step S17.

Note that in the processing of step S15, in cases in which steering torque Tr predetermined torque Trim, namely in cases in which it is determined that there is intent to override, the ALC controller 70 places the ALC control in the non-enabled state from which ALC control cannot be executed. When this is performed, the previously set flag may be cleared.

When processing transitions from step S15 to step S16, the ALC controller 70 once again determines whether or not the driver intends to perform an override (intervention operation). Here, the ALC controller 70 compares the steering torque Tr with the predetermined torque Trst1 (e.g., 1.0 N) to determine whether or not there is an intent to override. In cases in which the steering torque Tr is less than or equal to the predetermined torque Trst1 (step S16: NO), it is determined that there is no intent to override. In such cases, processing transitions to step S19 illustrated in FIG. 7. However, in cases in which the steering torque Tr is greater than the predetermined torque Trst1 (step S16; YES), it is determined that there is intent to override, and the processing of step S16 is repeated. Lane changing due to steering operation performed by the driver continues during this period.

Note that in cases in which a flag was set after step S13 has ended, the processing of step S16 may further determine whether or not a flag is still set, then if the flag is still set, processing may transition to step S19.

When processing transitions from step S15 to step S17, the ALC controller 70 determines whether or not the vehicle 10 is performing a predetermined sideways movement. For example, whether the vehicle 10 is straddling the lane border between the two lanes 104l and 104r, or whether a sideways movement amount is greater than or equal to a predetermined amount. The sideways movement amount of the vehicle 10 is computed based on the respective camera information output from the cameras 34, 38l, and 38r. For example, the sideways movement amount is computed from the position, the amount of change in position, and the like of the vehicle 10 with respect to the lane markings 102a to 102c. It is also possible to compute the sideways movement amount from a travel distance d computed from the vehicle speed V, the steering angle θ, and a travel time. It is also possible to find the sideways movement amount by measuring the position of the vehicle 10 using a non-illustrated satellite positioning system (for example, GPS). In cases in which the vehicle 10 is performing a predetermined sideways movement (step S17: YES), processing transitions to step S18. However, in cases in which the vehicle 10 is not performing a predetermined sideways movement (step S17: NO), processing returns to step S15. Lane changing due to steering operation performed by the driver continues during this period.

Note that in the processing of step S17, in cases in which there is lane straddling or a sideways movement amount a predetermined amount, namely in cases in which the sideways movement amount of the vehicle 10 is large, the ALC controller 70 places the ALC control in the enabled state from which ALC control can be executed. When this is performed, the flag may be set once again.

When processing transitions from step S17 to step S18, the ALC controller 70 determines whether or not the driver intends to end the override. Here, the ALC controller 70 compares the steering torque Tr with the predetermined torque Trst2 (e.g., 2.0 N) to determine whether or not there is an intent to end the override. In cases in which the steering torque Tr is less than or equal to the predetermined torque Trst2 (step S18: YES), it is determined that there is intent to end the override. In such cases, processing transitions to step S19 illustrated in FIG. 7. However, in cases in which the steering torque Tr is greater than the predetermined torque Trst2 (step S18: NO), it is determined that there is no intent to end override, and the processing of step S18 is repeated. Lane changing due to steering operation performed by the driver continues during this period.

Note that in cases in which a flag was set after step S17 ends, the processing of step S18 may further determine whether or not a flag is still set, then if the flag is still set, processing may transition to step S19.

When processing transitions from one of step S12, step S16, or step S18 to step S19 illustrated in FIG. 7, ALC control processing is executed. In ALC control processing (FIG. 8), ALC control is executed. ALC control executed via step S12 corresponds to that of Pattern 1 described above (FIG. 3A). ALC control executed via step S16 corresponds to that of Pattern 2 (FIG. 3B) or Pattern 4 (FIG. 4B) described above. ALC control executed via step S18 corresponds to that of Pattern 3 described above (FIG. 4A). When the processing of step S19 ends, ALC control processing ends.

At step S20, the ALC controller 70 executes ALC control post-processing. Here, the ALC controller 70 outputs a stop flashing signal to the direction indicating device 18 through the input/output section 52. In accordance with the stop flashing signal, the direction indicating device 18 switches the respective lamp 48 from the operating state to the non-operating state. The ALC controller 70 also outputs a signal for requesting restart to the LKAS controller 64 and the RDM controller 66. In accordance with the restart request, the LKAS controller 64 and the RDM controller 66 switch the LKAS control and the RDM control from the non-operating state to the operating state. When the processing of step S20 ends, ALC determination processing ends, and processing returns to the ALC processing (FIG. 5).

3-3 ALC Control Processing

Figure 8:
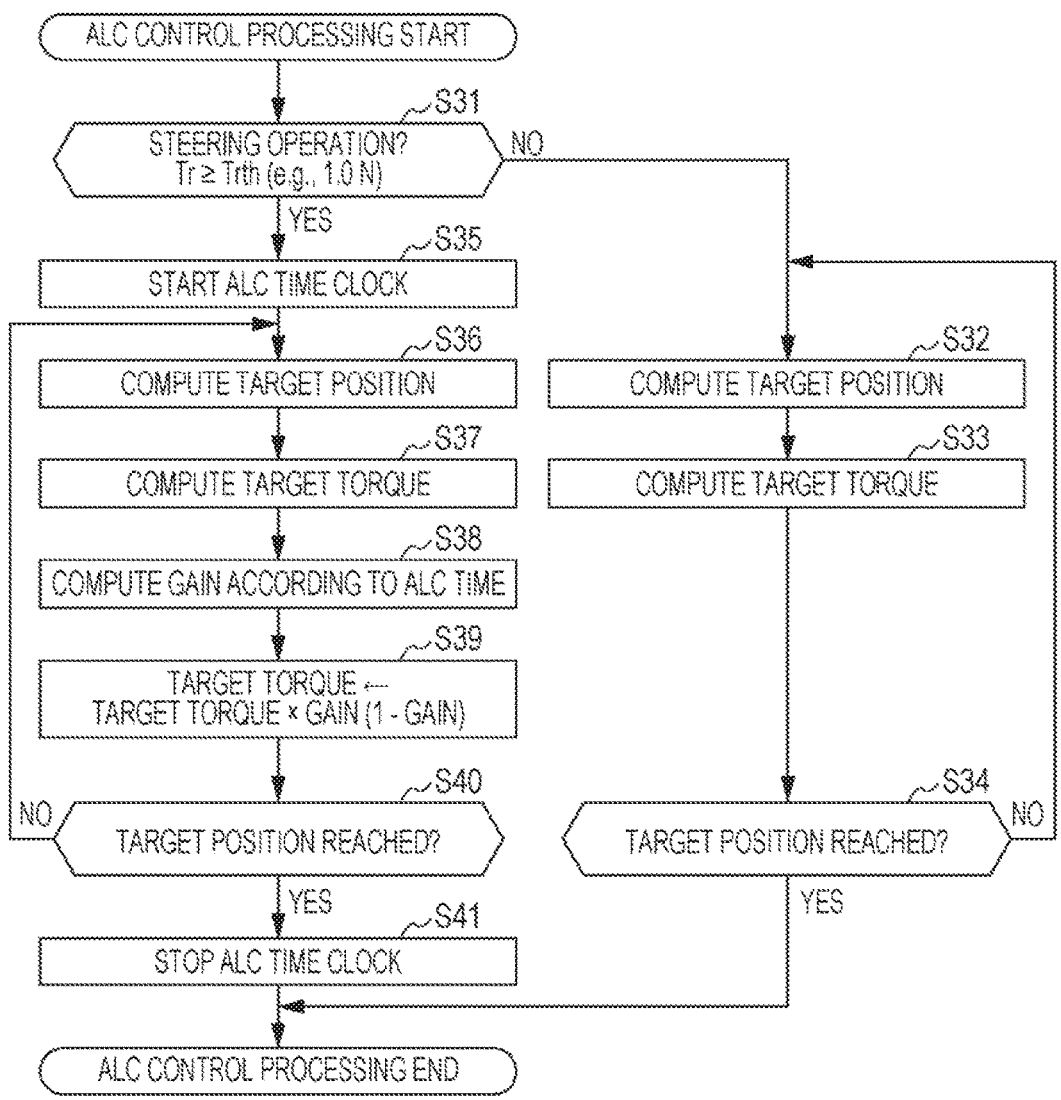
FIG. 8 is a flowchart of ALC control processing.

Explanation follows regarding the ALC control processing executed in step S19 of the ALC determination processing illustrated in FIG. 7, with reference to FIG. 8. When starting ALC control, the driving assistance device 12 according to the present embodiment executes processing distinguished between processing when the driver is not performing steering operation (step S32 to step S34) and processing when the driver is performing steering operation (step S35 to step S41). Step S35 to step S41 are processing for the ALC controller 70 to smoothly take over steering operation from the driver.

At step S31, the ALC controller 70 determines whether or not there is steering operation by the driver. Here, the ALC controller 70 compares the steering torque Tr with a torque threshold value Trth (e.g., 1.0 N) to determine whether or not there is steering operation. In cases in which the steering torque Tr is less than the torque threshold value Trth (step S31: NO), it is determined that there is no steering operation. In such cases, processing transitions to step S32. However, in cases in which the steering torque Tr is greater than or equal to the torque threshold value Trth (step S31: YES), it is determined that there is steering operation. In such cases, processing transitions to step S35.

When processing transitions from step S31 to step S32, the ALC controller 70 detects the left and right lane markings 102a and 102b defining the left lane 1041 (also referred to as "target lane 1041" hereafter) in the operation direction of the lever 46 or the steering direction of the steering wheel 80 based on the respective camera information (FIG. 3A, FIG. 3B, FIG. 4A, and FIG. 4B). The ALC controller 70 computes a target position in the target lane 1041 based on the left and right lane markings 102a and 102b. A central position between the left and right lane markings 102a and 102b, for example, is set as the target position.

At step S33, the ALC controller 70 computes the target torque Trtr for moving the vehicle 10 to the target position in the target lane 1041. The target torque Trtr is computed based on the vehicle speed V, the steering angle θ, the yaw rate Yr, and the like. The ALC controller 70 outputs a signal (referred to as "target torque signal" hereafter) corresponding to the target torque Trtr to the EPS system 26 through the input/output section 52. The EPS ECU 88 controls the electric motor 86 based on the target torque signal.

At step S34, the ALC controller 70 determines whether or not the vehicle 10 has reached the target position based on the respective camera information. In cases in which the target position has been reached (step S34: YES), ALC control processing ends. Then, processing returns to the ALC determination processing (FIG. 7). However, in cases in which the target position has not been reached (step S34: NO), processing returns to step S32.

When processing transitions from step S31 to step S35, the ALC controller 70 causes the timer 58 to start clocking an execution time t (referred to as "ALC time t" hereafter) of ALC control.

At step S36, similarly to step S32, the ALC controller 70 computes a target position in the target lane 1041. At step S37, similarly to step S33, the ALC controller 70 computes a target torque Trtr.

Figure 9:
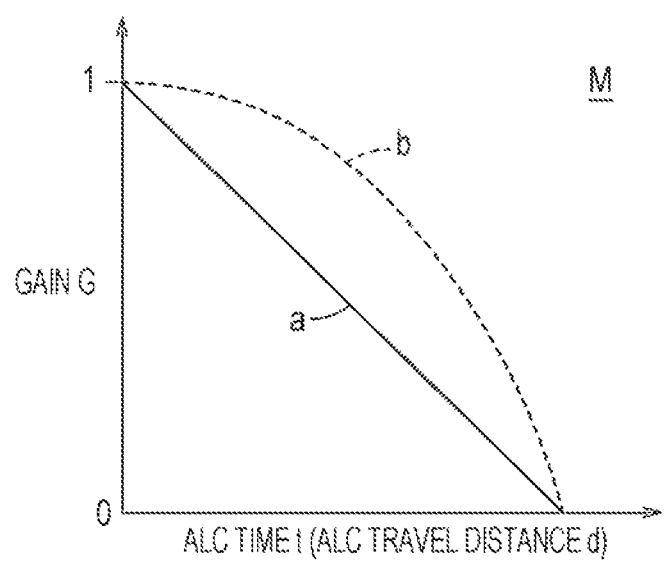
FIG. 9 is a map associating ALC time (ALC travel distance) and gain.

At step S38, the ALC controller 70 computes a gain G corresponding to an ALC time t based on a map M (FIG. 9) stored in the storage section 56. The map M associates gain G with ALC time t so as to be monotonically decreasing, namely, such that as ALC time t increases, gain G decreases. For example, the rate of decrease of gain G may be constant as illustrated by the solid line a in FIG. 9, or the rate of decrease of gain G may gradually increase as ALC time t increases as illustrated by the broken line b in FIG. 9.

At step S39, the ALC controller 70 adjusts the target torque Trtr computed at step S37 using the gain G computed at step S38. For example, the calculation result of target torque Trtr×(1−gain G) is set as a new target torque Trtr. The ALC controller 70 outputs the target torque signal to the EPS system 26 through the input/output section 52. The EPS ECU 88 controls the electric motor 86 based on the target torque signal. The steering assist force generated by the electric motor 86 can be gradually increased as ALC time t elapses by adjusting the target torque Trtr.

At step S40, the ALC controller 70 determines whether or not the vehicle 10 has reached the target position. In cases in which the target position has been reached (step S40: YES), processing transitions to step S41. However, in cases in which the target position has not been reached (step S40: NO), processing returns to step S36.

At step S41, the ALC controller 70 causes the timer 58 to stop clocking the ALC time t. The ALC control processing then ends. When the processing of step S41 ends, the ALC control processing ends, and processing returns to the ALC determination processing (FIG. 7).

4 Other Embodiments

The vehicle 10 described above performs RDM control as steering suppression control. Instead of this, the vehicle 10 may perform control according to a lane departure warning (LDW control).

Although the vehicle 10 described above utilizes the yaw rate Yr when computing the target torque Trtr, a lateral G may also be utilized.

The ALC possible torque Trpo (first torque) and the ALC start torque Trst1 (second torque) may be set to the same value. This enables ALC control to be quickly executed after the driver has performed steering operation. The ALC not-possible torque Trim (third torque) and the ALC start torque Trst2 (fourth torque) may also be set to the same value. This enables ALC control to be quickly executed after the vehicle 10 performs a predetermined sideways movement.

In the embodiment described above, in the case of Pattern 3 illustrated in FIG. 4A, configuration is such that steering operation is mainly performed by the driver over the first half of a lane change, and steering operation is mainly performed by the ALC controller 70 of the driving assistance device ECU 20 over the second half of the lane change. Configuration may be such that as a result of the driver mainly performing steering operation over the first half of the lane change, when a portion or all of the vehicle 10 has entered a target lane 104l, steering operation is mainly performed by the LKAS controller 64 instead of the ALC controller 70 over the second half of the lane change.

At step S16 and step S18 in FIG. 6, as long as the steering torque Tr is not less than or equal to the predetermined torques Trst1 and Trst2, steering operation by the driver, which is an override here, is continued. Configuration may be such that the processing of step S16 and step S18 performs a time determination in addition to (or instead of) the steering torque Tr determination. For example, at step S16 and step S18, ALC control may start when the passage of a predetermined amount of time has been confirmed. Similarly, processing may transition to step S18 when the passage of a predetermined amount of time has been confirmed at step S17.

In the processing of step S35 to step S41 in FIG. 8, a clock is provided for the ALC time t. Instead of this, a travel distance d of the vehicle 10 may be measured. In such cases, measurement of the travel distance d of the vehicle 10 is started at step S35, and measurement of the travel distance d is ended at step S41. The map M illustrated in FIG. 9 may also associate the gain G with the travel distance d of the vehicle 10 under ALC control (ALC travel distance d).

5 Summary of Embodiments

The driving assistance device 12 includes the nearby vehicle recognition section 60 and the lane marking recognition section 62 (recognition section), the LC determination section 68 (lane change determination section), the ALC controller 70 (automatic lane change controller), the torque sensor 84, and the RDM controller 66 (steering suppression controller). The nearby vehicle recognition section 60 and the lane marking recognition section 62 recognize lane markings and objects nearby the vehicle. The LC determination section 68 determines whether or not lane changing is possible based on recognition results from the nearby vehicle recognition section 60 and the lane marking recognition section 62. In cases in which the LC determination section 68 has determined that lane changing is possible and operation of the direction indicating device 18 has been detected, the ALC controller 70 executes ALC control of the vehicle 10 in the direction instructed by the operation. The torque sensor 84 detects a steering torque and a steering direction. The RDM controller 66 executes RDM control (steering suppression control). However, the RDM controller 66 does not execute RDM control in cases in which lane changing has been determined to be possible by the LC determination section 68 and the torque sensor 84 has detected a steering input of a predetermined amount or greater.

In cases in which lane changing is possible and a steering input is greater than or equal to a predetermined amount, the driving assistance device 12 does not execute RDM control. Accordingly, in cases in which lane changing is possible, if the driver performs steering operation using the steering wheel 80 with the intent of executing ALC control, an unnecessary warning produced by the RDM control can be suppressed. The driver therefore does not experience discomfort during ALC.

In cases in which the LC determination section 68 has determined that lane changing is possible and a steering input greater than or equal to the ALC possible torque Trpo (first torque) has been detected based on a detection result of the torque sensor 84, the ALC controller 70 places the ALC control in the enabled state (step S13 in FIG. 6: YES). This configuration enables the placement of ALC control into the enabled state, namely, into a state from which ALC control can be started at any time, to be triggered by a steering torque Tr from steering operation performed by the driver becoming greater than or equal to the ALC possible torque Trpo (first torque).

In cases in which the steering torque Tr has been detected to be less than or equal to the ALC start torque Trst1 (second torque) not greater than the ALC possible torque Trpo (first torque) after detection of the ALC possible torque Trpo (first torque), the ALC controller 70 starts ALC control of the vehicle 10 along the steering direction (step S16 in FIG. 6: YES). This configuration enables the start of ALC control to be triggered by a steering torque Tr from steering operation performed by the driver first becoming greater than or equal to the ALC possible torque Trpo (first torque), and then subsequently becoming less than or equal to the ALC start torque Trst1 (second torque). In other words, the driver continues the steering operation, and in cases in which a state where the steering torque Tr is greater than the ALC start torque Trst1 (second torque) is continually maintained, the ALC control is placed into a standby state, enabling steering operation by the driver to be given priority.

In cases in which a steering torque Tr greater than or equal to the ALC not-possible torque Trim (third torque) that is greater than the ALC possible torque Trpo (first torque) has been detected based on a detection result of the torque sensor 84, the ALC controller 70 places the ALC control of the vehicle 10 along the steering direction in the non-enabled state (step S15 in FIG. 6: NO). This configuration enables steering operation by the driver to be given priority.

In cases in which either the vehicle 10 has been detected to be straddling the lanes 104l and 104r or the vehicle 10 has been detected to have moved sideways by a predetermined distance or greater based on a recognition result of the lane marking recognition section 62 after the ALC control has been placed in a state from which it cannot be started, the ALC controller 70 places the ALC control in the enabled state (step S17 in FIG. 6: YES). This configuration enables steering operation by the driver to be given priority at the start of lane changing, and enables the placement of ALC control into the enabled state, namely, into a state from which ALC control can be started at any time, to be triggered by sideways movement of the vehicle 10 of a predetermined distance or greater.

In cases in which a steering torque Tr has been detected to be less than or equal to the ALC start torque Trst2 (fourth torque) not greater than the ALC not-possible torque Trim (third torque) after either the vehicle 10 has been detected to be straddling the lanes 104*l* and 104*r* or the vehicle 10 has been detected to have moved sideways by a predetermined distance or greater, the ALC controller 70 starts ALC control (step S18 in FIG. 6: YES). This configuration enables steering operation by the driver to be given priority at the start of lane changing, and enables the start of ALC control to be triggered by sideways movement of the vehicle 10 of a predetermined distance or greater and the steering torque becoming less than or equal to the ALC start torque Trst2 (fourth torque). Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A driving assistance device comprising:
    a recognition controller configured to recognize lane markings and objects nearby a vehicle;
    a lane change determination controller configured to determine whether or not a lane changing is possible based on a recognition result of the recognition controller;
    an automatic lane change controller configured to, when the lane changing has been determined to be possible by the lane change determination controller and an operation to a direction indicator has been detected, execute an automatic lane change control of the vehicle in a direction indicated by the operation;
    a torque sensor configured to detect a steering torque and a steering direction; and
    a steering suppression controller configured to execute a steering suppression control,
    wherein the steering suppression controller does not execute the steering suppression control when the lane changing has been determined to be possible by the lane change determination controller and the torque sensor has detected a predetermined steering input torque or greater,
    wherein the automatic lane change controller switches the automatic lane change control in an enabled state when the lane changing has been determined to be possible by the lane change determination controller and a steering input torque that is detected by the torque sensor has been detected to be greater than or equal to a first torque based on a detection result of the torque sensor, and
    wherein, after detection of the steering input torque, the automatic lane change controller starts the automatic lane change control of the vehicle along the steering direction at a time when the steering torque has been detected to be a value less than or equal to a second torque which is less than the first torque.

2. The driving assistance device according to claim 1, wherein:
    the automatic lane change controller switches the automatic lane change control of the vehicle along the steering direction in a non-enabled state when the steering input torque has been detected to be greater than or equal to a third torque that is greater than the first torque based on a detection result of the torque sensor.

3. The driving assistance device according to claim 2, wherein, after switching the automatic lane change control in the non-enabled state, the automatic lane change controller switches the automatic lane change control in the enabled state when the vehicle has been detected to be straddling a lane or the vehicle has been detected to have moved sideways by a predetermined distance or greater based on a recognition result of the recognition controller.

4. The driving assistance device according to claim 3, wherein, after the vehicle has been detected to be straddling the lane or the vehicle has been detected to have moved sideways by the predetermined distance or greater, the automatic lane change controller starts the automatic lane change control when the steering torque has been detected to be a value less than or equal to a fourth torque that is less than the third torque.

5. The driving assistance device according to claim 1, wherein the steering suppression controller stops the steering suppression control when the lane changing has been determined to be possible by the lane change determination controller and the torque sensor has detected the predetermined steering input torque or greater during a time that the steering suppression controller is executing the steering suppression control.

6. The driving assistance device according to claim 1, wherein the steering suppression control assists the vehicle to stay traveling in the current lane.

7. The driving assistance device according to claim 1, wherein the steering suppression control includes at least one of a road departure mitigation control and a lane departure warning control.

8. The driving assistance device according to claim 1, further comprising a lane keeping assist controller configured to execute a lane keeping assist control,
    wherein the lane keeping assist controller stops the lane keeping assist control when the lane changing has been determined to be possible by the lane change determination controller and the torque sensor has detected the predetermined steering input torque or greater during a time that the lane keeping assist controller is executing the lane keeping assist control.

9. A vehicle control method executed by an on board a computer, the method comprising steps of:
    recognizing lane markings and objects nearby a vehicle;
    executing, when a lane changing has been determined to be possible based on a recognition result of the recognizing step and an operation to a direction indicator has been detected, an automatic lane change control of the vehicle in a direction indicated by the operation;
    detecting a steering torque and a steering direction by a torque sensor; and
    executing a steering suppression control and stopping the steering suppression control when the lane changing has been determined to be possible and the torque sensor has detected a predetermined steering input torque or greater, wherein the step of executing the automatic lane change control further comprises:

switching the automatic lane change control in an enabled state when the lane changing has been determined to be possible and a steering input torque that is detected by the torque sensor has been detected to be greater than or equal to a first torque based on a detection result of the torque sensor, and after detection of the steering input torque, starting the automatic lane change control of the vehicle along the steering direction at a time when the steering torque has been detected to be a value less than or equal to a second torque which is less than the first torque.

10. A non-transitory computer readable medium storing a vehicle control program for causing a computer to execute processing, the processing comprising steps of:

recognizing lane markings and objects nearby a vehicle;

executing, when a lane changing has been determined to be possible based on a recognition result of the recognizing step and an operation to a direction indicator has been detected, an automatic lane change control of the vehicle in a direction indicated by the operation;

detecting a steering torque and a steering direction by a torque sensor; and executing a steering suppression control and stopping the steering suppression control when the lane changing has been determined to be possible and the torque sensor has detected a predetermined steering input torque or greater, wherein the step of executing the automatic lane change control further comprises:

switching the automatic lane change control in an enabled state when the lane changing has been determined to be possible and a steering input torque that is detected by the torque sensor has been detected to be greater than or equal to a first torque based on a detection result of the torque sensor, and after detection of the steering input torque, starting the automatic lane change control of the vehicle along the steering direction at a time when the steering torque has been detected to be a value less than or equal to a second torque which is less than the first torque.

11. A driving assistance device comprising:

a recognition controller configured to recognize lane markings and objects nearby a vehicle;

a lane change determination controller configured to determine whether or not a lane changing is possible based on a recognition result of the recognition controller;

an automatic lane change controller configured to, when the lane changing has been determined to be possible by the lane change determination controller and an operation to a direction indicator has been detected, execute an automatic lane change control of the vehicle in a direction indicated by the operation;

a torque sensor configured to detect a steering torque and a steering direction; and a steering suppression controller configured to execute a steering suppression control, wherein the steering suppression controller does not execute the steering suppression control when the lane changing has been determined to be possible by the lane change determination controller and the torque sensor has detected a predetermined steering input torque or greater;

wherein the automatic lane change controller switches the automatic lane change control in an enabled state when the lane changing has been determined to be possible by the lane change determination controller and a steering input torque that is detected by the torque sensor has been detected to be greater than or equal to a first torque based on a detection result of the torque sensor, and wherein, after switching the automatic lane change control in the enabled state the automatic lane change controller switches the automatic lane change control of the vehicle along the steering direction in a non-enabled state when the steering input torque has been detected to be greater than or equal to a third torque that is greater than the first torque based on a detection result of the torque sensor, and wherein, after switching the automatic lane change control in the non-enabled state, the automatic lane change controller switches the automatic lane change control in the enabled state when the vehicle has been detected to be straddling a lane or the vehicle has been detected to have moved sideways by a predetermined distance or greater based on a recognition result of the recognition controller.

12. The driving assistance device according to claim 11, wherein, after the vehicle has been detected to be straddling the lane or the vehicle has been detected to have moved sideways by the predetermined distance or greater, the automatic lane change controller starts the automatic lane change control when the steering torque has been detected to be a value less than or equal to a fourth torque that is less than the third torque.

13. A vehicle control method executed by a computer, the method comprising steps of:

recognizing lane markings and objects nearby a vehicle;

executing, when a lane changing has been determined to be possible based on a recognition result of the recognizing step and an operation to a direction indicator has been detected, an automatic lane change control of the vehicle in a direction indicated by the operation;

detecting a steering torque and a steering direction by a torque sensor; and executing a steering suppression control and stopping the steering suppression control when the lane changing has been determined to be possible and the torque sensor has detected a predetermined steering input torque or greater;

wherein the step of executing the automatic lane change control further comprises:

switching the automatic lane change control in an enabled state when the lane changing has been determined to be possible and a steering input torque that is detected by the torque sensor has been detected to be greater than or equal to a first torque based on a detection result of the torque sensor;

after switching the automatic lane change control in the enabled state, switching the automatic lane change control of the vehicle along the steering direction in a non-enabled state when the steering input torque has been detected to be greater than or equal to a third torque that is greater than the first torque based on a detection result of the torque sensor; and after switching the automatic lane change control in the non-enabled state, switching the automatic lane change control in the enabled state when the vehicle has been detected to be straddling a lane or the vehicle has been detected to have moved sideways by a predetermined distance or greater based on the recognition result.

14. A non-transitory computer readable medium storing a vehicle control program for causing a computer to execute processing, the processing comprising steps of:

recognizing lane markings and objects nearby a vehicle;

executing, when a lane changing has been determined to be possible based on a recognition result of the recognizing step and an operation to a direction indicator has been detected, an automatic lane change control of the vehicle in a direction indicated by the operation;

detecting a steering torque and a steering direction by a torque sensor; and executing a steering suppression control and stopping the steering suppression control when the lane changing has been determined to be possible and the torque sensor has detected a predetermined steering input torque or greater, wherein the step of executing the automatic lane change control further comprises:

switching the automatic lane change control in an enabled state when the lane changing has been determined to be possible and a steering input torque that is detected by the torque sensor has been detected to be greater than or equal to a first torque based on a detection result of the torque sensor;

after switching the automatic lane change control in the enabled state, switching the automatic lane change control of the vehicle along the steering direction in a non-enabled state when the steering input torque has been detected to be greater than or equal to a third torque that is greater than the first torque based on a detection result of the torque sensor; and after switching the automatic lane change control in the non-enabled state, switching the automatic lane change control in the enabled state when the vehicle has been detected to be straddling a lane or the vehicle has been detected to have moved sideways by a predetermined distance or greater based on the recognition result.

* * * * *